US011275183B2

(12) United States Patent
Gordon et al.

(10) Patent No.: US 11,275,183 B2
(45) Date of Patent: Mar. 15, 2022

(54) RADON DETECTION WITH A THREE-PART DIFFUSION CHAMBER AND SCINTILLATION COATING OVER AN EXTENDED SURFACE

(71) Applicant: Inspirotec, Inc., North Chicago, IL (US)

(72) Inventors: Julian Gordon, Lake Bluff, IL (US); Thomas Brya, Winnetka, IL (US)

(73) Assignee: Inspirotec, Inc., North Chicago, IL (US)

( * ) Notice: Subject to any disclaimer, the term of this patent is extended or adjusted under 35 U.S.C. 154(b) by 0 days.

(21) Appl. No.: 17/325,389

(22) Filed: May 20, 2021

(65) Prior Publication Data

US 2021/0364659 A1 Nov. 25, 2021

Related U.S. Application Data

(60) Provisional application No. 63/028,108, filed on May 21, 2020.

(51) Int. Cl.
*G01T 1/20* (2006.01)
*G01T 1/16* (2006.01)
*G01T 1/185* (2006.01)

(52) U.S. Cl.
CPC .......... *G01T 1/2006* (2013.01); *G01T 1/1603* (2013.01); *G01T 1/185* (2013.01)

(58) Field of Classification Search
CPC ...... G01T 1/2006; G01T 1/1603; G01T 1/185
See application file for complete search history.

(56) References Cited

U.S. PATENT DOCUMENTS 5,235,190 A * 8/1993 Tucker ................ G01N 1/2205
250/304
5,336,906 A 8/1994 Ito et al.
(Continued)

FOREIGN PATENT DOCUMENTS

| CA | 2424267 A1 | 9/2004 |
| WO | 2008/080753 A1 | 7/2008 |
| WO | 2013/011321 A2 | 1/2013 |

OTHER PUBLICATIONS

Kim et al. "Analog CMOS Image Sensor-based Radon Counter", IJTSRD, vol. 2, issue 2, Jan-Feb. 2018, p. 54-59. (Year: 2018).*
(Continued)

*Primary Examiner* — David P Porta
*Assistant Examiner* — Mamadou Faye
(74) *Attorney, Agent, or Firm* — Wood, Phillips, Katz, Clark & Mortimer

(57) ABSTRACT

There is a need for routine radon screening of homes, especially in states which require radon screening prior to sale, that are compact, inexpensive, do not require a professional to operate, and which, further, can yield a significant measurement in hours or minutes rather than days. The present invention provides for a combination of control of entry of radon by adjusting the separation between and the area of a multi-element shell, into a measuring chamber while excluding light and extraneous particulate material. This permits a design with a faster response time and also provides for the accurate measurement of individual scintillation events in a scintillating medium by imaging of, and discriminating specific energy levels related to the known energies of alpha particles emitted in the decay pathway of radon. This discrimination functions as an alpha-particle spectrometer and will. Thus, other background radioactive disintegrations or cosmic ray events will be filtered out of the signal. The invention will make use of the optics and (Continued)

imaging arrays as are in state-of-the-art mobile phone cameras. Use of camera components of mobile phones will permit cost savings since they are already in very large-scale production.

20 Claims, 11 Drawing Sheets

(56) References Cited

U.S. PATENT DOCUMENTS

| | | | |
|---|---|---|---|
| 5,489,780 | A | 2/1996 | Diamondis |
| 7,636,409 | B2 | 12/2009 | Nelson |
| 9,354,214 | B2 | 5/2016 | Sundal et al. |
| 2004/0129890 | A1* | 7/2004 | Berman .................. G01T 1/178 |
| | | | 250/380 |
| 2004/0178361 | A1 | 9/2004 | Fontbonne |
| 2005/0072211 | A1* | 4/2005 | Weyl .................. G01N 27/4077 |
| | | | 73/23.2 |
| 2007/0258122 | A1 | 11/2007 | Chamgoulov et al. |
| 2009/0230305 | A1 | 9/2009 | Burke et al. |
| 2018/0210064 | A1 | 7/2018 | Send et al. |

OTHER PUBLICATIONS

H. F. Lucas, Improved Low-Level Alpha-Scintillation Counter for Radon. Review of Scientific Instruments 28, 680-683 (1957).
H. Gast, R. Gellermann, Radon Measurements by Means of a New Measuring Chamber With Improved Temporal Resolution. Applied Radiation and Isotopes 39, 1015-1017 (1988).

* cited by examiner

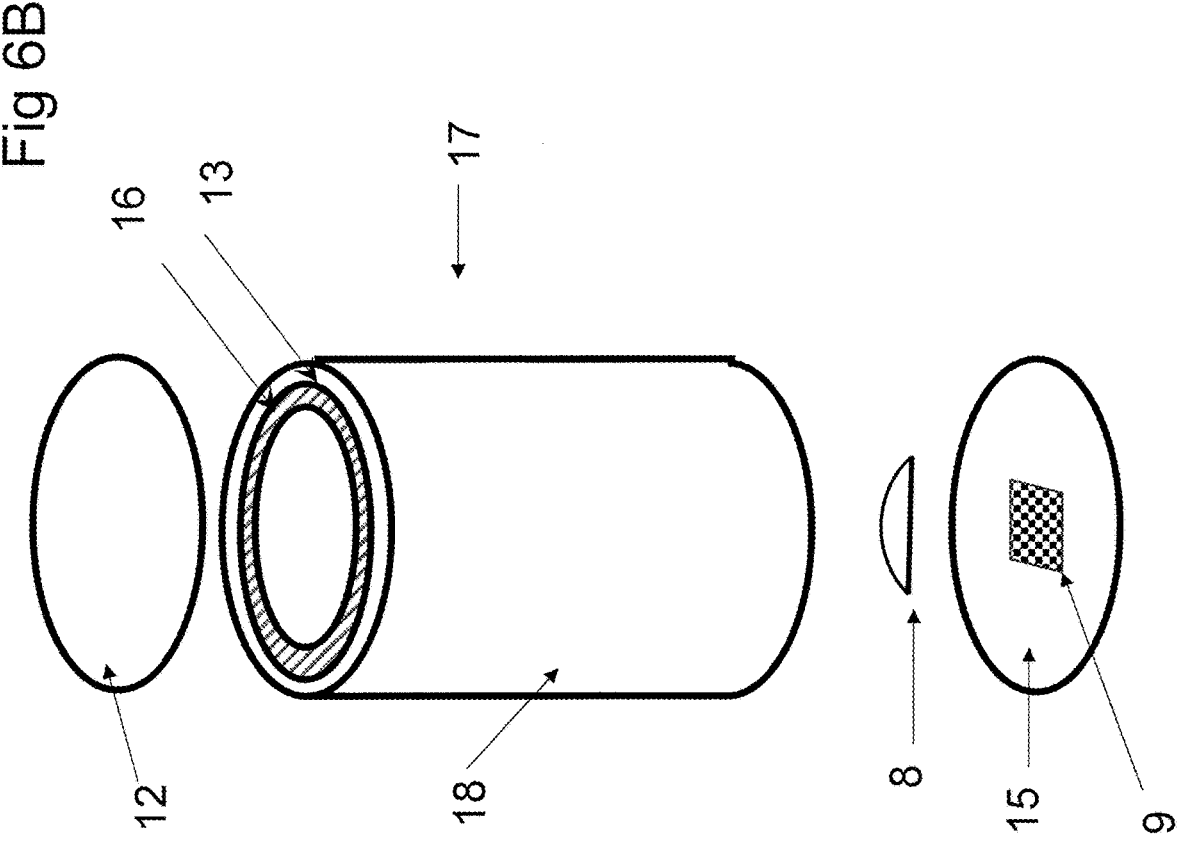
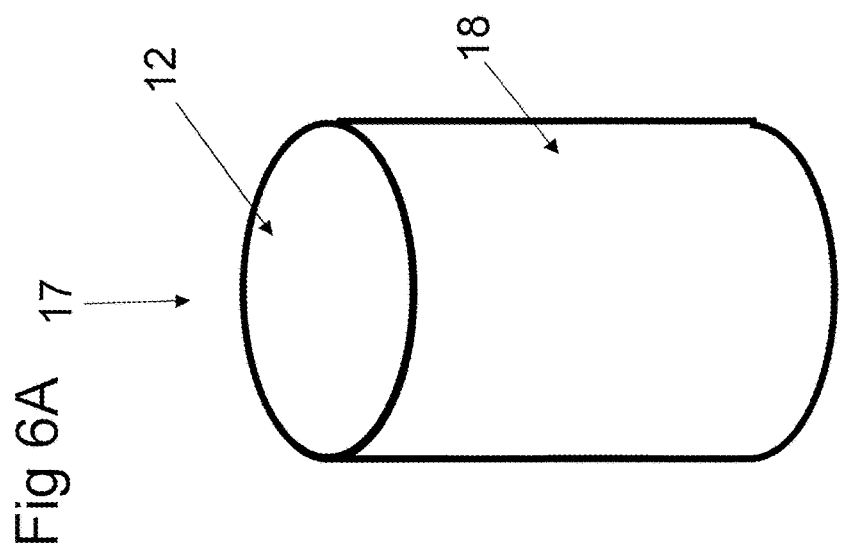

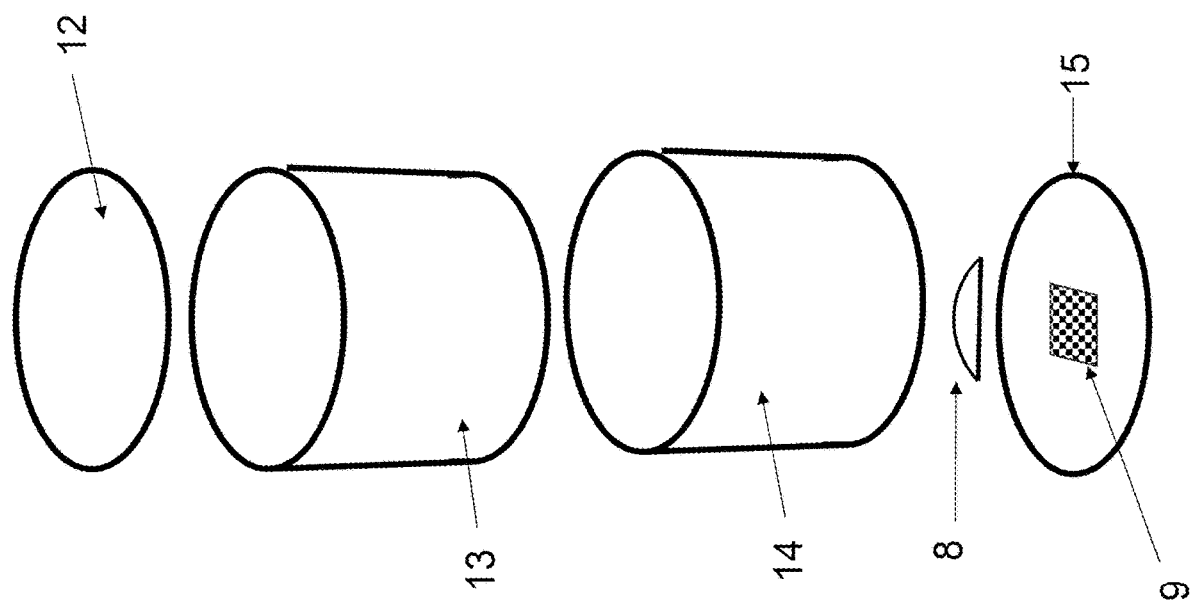
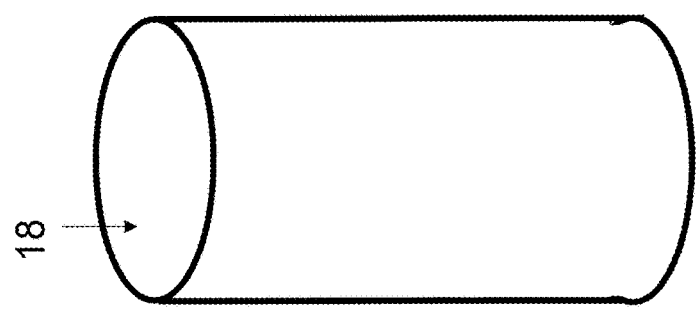
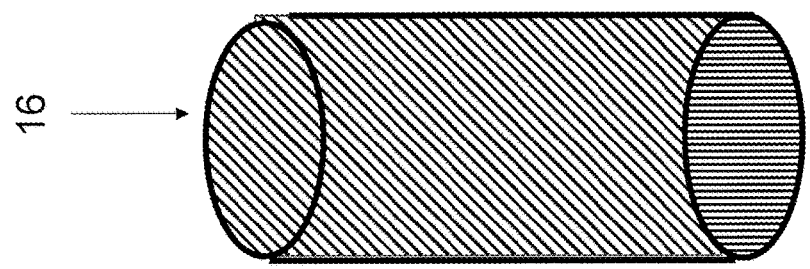

RADON DETECTION WITH A THREE-PART DIFFUSION CHAMBER AND SCINTILLATION COATING OVER AN EXTENDED SURFACE

CROSS-REFERENCE TO RELATED APPLICATIONS

This application claims priority of Provisional Ser. No. 63/028,108, filed May 21, 2020, the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to radon detection and, more particularly to diffusion chamber having a scintillation coating over an extended surface.

BACKGROUND OF THE INVENTION

Radon is a radioactive element which at normal temperature and pressure is a gas. It is colorless, odorless and tasteless which means that its presence and concentration is not readily detectable by human beings. However, due to its radioactivity, it can be harmful if the concentration is too high. At normal concentrations, radiation from radon typically accounts for around half of a person's annual natural radiation dose.

The most stable isotope of radon is Radon-222 which has a half-life of 3.8 days and is produced as part of the decay chain of Uranium-238 which is present throughout the Earth's crust. Being a noble gas, radon readily diffuses out of the ground and into the air around us. The daughter products of radon decay tend to be charged particles which will readily stick to dust or smoke particles in the air. When these particles are inhaled, they can lodge in the lungs and the subsequent radiation from decay of the radon daughter products causes a risk of lung cancer. Consequently, higher concentrations of radon lead to higher risks of cancer.

The concentration of radon in the atmosphere depends, amongst other things, on ventilation. Areas with good ventilation will have lower radon concentrations, whereas a lack of ventilation leads to radon accumulation and thus increases the radiation level in such areas. Radon levels outside therefore tend to be lower than inside buildings. For example, typical radiation doses from radon may be around 10-20 Bq/m3 outside and may be around 100 Bq/m3 inside. Radon levels can also vary significantly due to variations in geographic location (e.g., different geologies), or due to differences in building materials.

Radon decays by emission of an alpha particle with an energy of 5.5 MeV. The resultant Polonium-218 has a half-life of about 3 minutes before emitting an alpha particle of 6.0 MeV. The resultant Lead-214 has a half-life of around 27 minutes before beta-decaying to Bismuth-214 which in turn has a half-life of 20 minutes and beta-decays to Polonium-214. Polonium-214 has a half-life of about 164 microseconds before emitting an alpha particle of 7.7 MeV resulting in Lead-210 which has a half-life of 22 years and is thus relatively stable.

Detection of radon to date has been divided into two main methods. The first method is active detection of alpha particles using a photodiode and the second method is passive detection of alpha particles using a track detector. Typically, the first method requires a large instrument and needs electrical power to be supplied. Such instruments have typically only been used for larger scale, e.g., commercial or industrial measurements as the instruments are bulkier and more expensive. The photodiode is placed in a diffusion chamber of the device. Alpha particles hitting the photodiode create a number of electron-hole pairs which will cause a small current to be generated. These current signals can be detected and counted to provide a measure of the radon concentration within the diffusion chamber. Such active measurements can be provided continuously in time rather than having to wait for the results of a laboratory analysis.

The second method uses much smaller detectors with no power to domestic customers. A passive (i.e., unpowered) track chamber is typically placed in a selected location and left for a predetermined period of time (typically from a few weeks up to about 3 months) after which it is sent back to a lab for analysis. Alpha particles emitted within the chamber leave tracks on a film which is also disposed within the chamber. These tracks can be detected in the lab and counted thus providing a measure of the radon concentration in the air within the chamber.

WO 2008/080753 describes a passive radon detector device with a diffusion chamber rotatably mounted above the detector so that it can be rotated in and out of the "ON" position above the detector. When the chamber is in position above the detector, the detector will detect alpha particles from gas which diffuses into the chamber. When the chamber is rotated out of position (the "OFF" position), the detector is covered (the chamber volume is essentially reduced to zero) and is therefore effectively isolated from radon in the surrounding environment.

US 2009/0230305 describes an active radon detector device which is battery powered. The photodiode detector is mounted on the main PCB and is covered by a sampling chamber, also mounted on the main PCB. The photodiode detects alpha particles within the sampling chamber and sends a detection signal to the processing circuitry on the main PCB. The processing circuitry includes a microprocessor unit.

CA 2424267 A1 discloses a further battery-powered radon detector.

U.S. Pat. No. 5,489,780 describes another active radon detector device in which a pressed metal filter is used as the wall of the diffusion chamber. This filter is mounted directly on the PCB over the photodiode detector, thus defining the sampling volume. The chamber walls are biased to a high voltage relative to the photodiode detector so as to create an electric field therebetween. The device is powered by a combination of an AC power supply and a DC battery pack.

In active detectors, it is desirable to create an electric field between the sensor and the walls of the diffusion chamber. For example, in a radon detector, when radon atoms within the chamber decay, the daughter products are typically positively charged particles. Such charged particles have a strong tendency to "plate out", i.e., to attach to nearby surfaces. Once a particle has plated out, it tends to stay put. Thus, the radon daughter products in such active devices tend to be distributed over the inside walls of the diffusion chamber. In the presence of an electric field as described above, those daughter products will drift in the direction of the electric field, i.e., towards the sensor. Therefore, the distribution of daughter products will be strongly concentrated on the surface of the sensor itself.

The advantage of such arrangements is that the sensor senses a much higher proportion of decays from particles which sit directly on its surface than from those distributed around the diffusion chamber walls. This is because for any given decay, the direction of the radiation is random. For particles located on the chamber walls, the sensor only represents a small solid angle of directions in which that radiation will be detected. By contrast, for particles on the surface of the sensor, the sensor represents close to 50% solid angle, i.e., it has close to 50% probability of detecting the radiation from the decay of such particles.

Thus, the electric field between the sensor and the chamber walls greatly increases the number of detected decays of radon daughter products and thereby greatly increases the rate of accumulation of data in the instrument. At typical atmospheric radon concentrations, the number of alpha particles emitted per unit time within the chamber can be very low (at typical radon concentrations, the detector in a chamber with a volume of about 25 cubic centimeters might only be expected to detect in the order of one alpha per hour). It can therefore take a significant amount of time to acquire enough data to provide a statistically reliable measurement. By increasing the rate of detections from radon daughter products, the rate of data accumulation can be increased and therefore a reliable read-out can be provided much faster. The conversion of the raw sensor data to an estimate of the radon concentration relies on a statistical analysis of the probability of sensing decays from various locations within the chamber. This analysis is influenced by a number of factors. One such factor is the probability that a daughter product will plate out on the sensor. This depends in part on the strength of the electric field between the sensor and the chamber walls. Therefore, variations in the strength of that field lead to variations in the probability of daughter products plating out on the sensor and thus variations in the accuracy of the calculated estimate of radon concentration.

It is therefore desirable to provide a regulated bias voltage to the diffusion chamber so that the electric field within the chamber remains relatively constant in strength. In larger instruments which operate from mains power, this can be achieved easily with voltage regulator circuits. However, such instruments are bulkier and consume more power. They are also restricted in that they can only be located in positions which are large enough to accommodate the instrument's bulk and in positions where mains power can be supplied. Battery powered instruments are much more flexible as they can be made smaller and can thus be placed in more restricted spaces. They can also be placed where no mains power (or other external power) is available. However, the voltage provided by typical consumer batteries varies over the lifetime of the battery. For example, a standard 1.5 V alkaline cell typically provides an output voltage of 1.6 V at the start of its life, falling to 1.1 V at the end of its life. Battery powered instruments are also limited by the lifetime of these batteries. If the instrument draws too much power, then either the lifetime of the device will be too short or the instrument will have to be made bulkier to accommodate larger batteries.

The bias voltage required to provide a sufficiently strong electric field within the diffusion chamber may be of the order of 10 V.

U.S. Pat. No. 9,354,214 describes a radon gas sensor instrument comprising a diffusion chamber with conductive walls and with a sensor disposed within the diffusion chamber. The diffusion chamber comprises two metal shells which engage to limit the diffusive inflow of gas and thus selectively allow the entrance of gas such as radon. The electric field drives charged disintegration products such as Polonium-218 toward a photodiode for detection. The low diffusion into the chamber results in a time to reach an equilibrium reading of at least three days.

Thus, prior art active radon sensors either have equilibration times that are short but permit interference from a range of events or particles.

A radon sensor with a chamber coated with ZnS—Ag scintillant and a window abutting a photomultiplier, referred to as the Lucas scintillation cells (1) is commercialized by Pylon Electronics Inc, Ottawa, Canada. A variant has a cylindrical electrode centrally mounted to propel charged radon daughter molecules to the electrode to restrict measurements to primary radon decay events. The scintillation events take place when a disintegration product strikes the wall coated with scintillant, and any light emitted is detected by a photomultiplier tube (2).

While plastic scintillators have been known for many years, there has been no suggestion in the prior art that they would be useful for radon detection. A typical plastic scintillator will yield 3,000 photons for a 5 MeV alpha particle, which will have a range of about 0.1 mm in that medium. Elgen Technology of Sweetwater, Tex., commercializes a range of organic scintillators for different applications.

The present invention is directed to further improvements and simplification of radon detection.

SUMMARY OF THE INVENTION

In accordance with one embodiment there is disclosed herein a radon detection device for quantitation of radon comprising a housing defining an enclosed chamber. The housing comprises partially overlapping metal components to exclude ambient light and allow diffusion of gas into the chamber. A sensor in the housing comprises an array of photodetectors for registering alpha particle disintegration. A voltage source provides a positive electrical bias to the housing relative to the sensor.

In accordance with another embodiment the invention is directed to a radon detection device for quantitation of radon comprising a housing defining an enclosed ionization chamber. The housing comprises partially overlapping metal components to allow diffusion of gas into the ionization chamber. A scintillant is disposed within the ionization chamber to capture charged particles. An image sensor in the housing detects point location and light intensity of individual scintillation events in the scintillant, thereby discriminating individual radon disintegration events. A voltage source provides a positive electrical bias to the sensor.

In another aspect the invention is directed to a radon detection device for quantitation of radon comprising a housing radially symmetric around a vertical axis and comprising an outer cylindrical sleeve receiving upper and lower metal ionization chamber shell parts each closed at one end defining an enclosed ionization chamber. The housing comprises gaps to allow diffusion of gas into the ionization chamber A scintillant is disposed within the ionization chamber to capture charged particles. An image sensor in the housing detects point location and light intensity of individual scintillation events in the scintillant, thereby discriminating individual radon disintegration events. A voltage source provides a positive electrical bias to the sensor.

Other objects, features, and advantages of the invention will become apparent from a review of the entire specification, including the appended claims and drawings.

BRIEF DESCRIPTION OF THE DRAWINGS

FIG. 6A is a perspective view of an alternative configuration where the radon detection device is cylindrical in form, and FIG. 6B shows the device partially disassembled;

FIG. 8 is an exploded view of the device of FIG. 6A;

DETAILED DESCRIPTION OF THE PREFERRED EMBODIMENT

Figure 1:
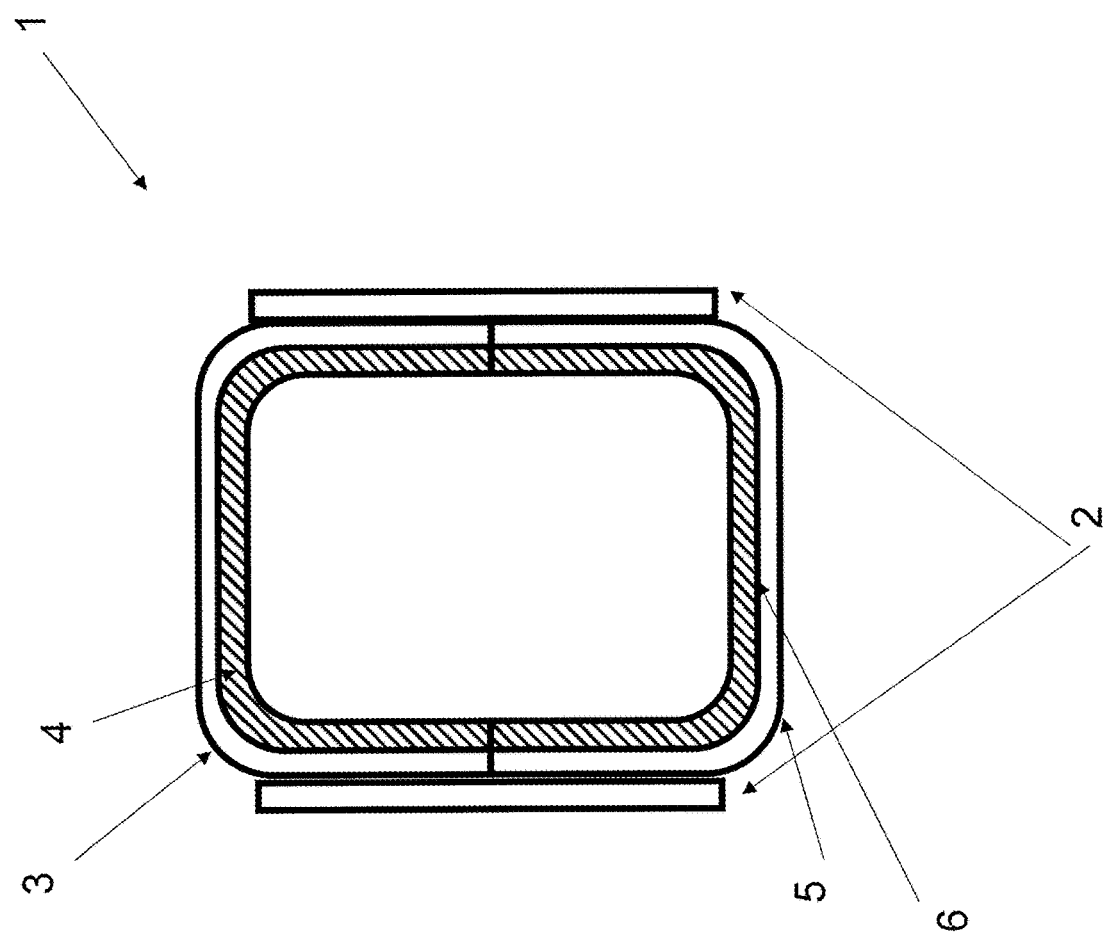
FIG. 1 shows a section through an assembled radon detection device in accordance with the invention with image sensor and optics omitted for simplicity.

The radon detection device in accordance with the present invention has a diffusion chamber that consists of three parts: two hemispheres of closed-ended cylinders joined together by a cylindrical sleeve. The sleeve permits precise control of the gaseous diffusion into the chamber by precise control of the relative diameters of the sleeve and the hemispheres and the area of overlap between them. One skilled in the art can optimize these parameters and optimize the combination of diffusion of the gas and minimization of interfering substances. Other state of the art devices attempt to minimize the interferences by voltage gating and limiting to measurement of specific radon daughter disintegration products. Some prior art devices comprise a dummy sensor that is used to subtract out extraneous interferences or vibration effects.

Most prior art devices use a photodiode detector or photomultiplier, or an anthracene crystal as a scintillation detector. In one aspect, the present invention makes use of the ability to create a larger three-dimensional sensor. This can be ZnS—Ag fluor as in prior art devices discussed above or, preferably, a plastic scintillator based on a matrix of polyvinyltoluene and fluors necessary to give the plastic scintillator required properties. Suitable fluors may be 2.5-diphenyloxazole (PPO) and POPOP (1,4-bis[2-(phenyloxazolyl)]-benzene). Plastic scintillation material may also be obtained as a varnish dissolved in xylene. From the 0.1 mm range of alpha particles in the material, plastic scintillators have the advantage over prior art ZnS—Ag scintillators in giving sharp point images for scintillation events due to alpha particles for imaging purposes, whereas ZnS—Ag will be somewhat more diffuse with lower peak luminosity when imaged. The plastic may be more readily machined or molded into any desired geometry. ZnS—Ag fluor, if used, may be plated directly on the interior surfaces of the internal metal sleeves, or may be coated on plastic which has been injection molded or machined for a precise fit. However, ZnSAg, being crystalline is structure, will not have the optical clarity of plastic scintillators.

The plastic scintillator may be cast as a shell which fits the interior surface of a diffusion chamber or as a coating applied as a varnish to the interior surface of a diffusion chamber. A large surface of alpha particle detector will thus be more efficient at detecting radon and daughter products disintegration than a photodiode, a photomultiplier, or a single crystal.

Prior art devices enhance the detection by providing a positive electric field bias to a housing relative to a photodetector within the chamber in attempt to direct charged daughter disintegration products of radon to the photodetector. In one embodiment, the present invention reverses this process and more efficiently captures the disintegrations on a larger capture surface comprising the scintillant. This can be rendered more efficient by applying a negative or ground voltage bias to the metal shell of the diffusion chamber and holding a photodetector at a positive voltage state. Since the plastic scintillant is non-conductive, it will not disturb the voltage gradient between the photodetector and the shell.

With this arrangement, it will be advantageous to take advantage of the imaging detecting capability of sensors such as CCD devices or CMOS sensors. CMOS sensors have the advantage of being manufactured with accompanying lensing for cameras in mobile phones, and thus will be available at very low cost. With suitable image analysis software, single point flashes would be detected, corresponding to the individual alpha particles release at the scintillant surface, thus discriminating from generalized disturbances generalized externally from cosmic rays or other background radiation, and from vibration.

Finally, the image analysis is used to determine energy levels by gating specific brightness levels corresponding to known energy levels of the various alpha particles emitted by disintegration of radon and its daughters. This would provide a final level of discrimination over random background events.

FIG. 1 shows a cross-section through a housing of a partially assembled radon detection device 1 according to a first embodiment, without detection componentry. The housing of the device 10 is radially symmetric around a vertical axis and consists of an outer cylindrical sleeve 2 and upper and lower ionization chamber shell parts 3 and 5. The sleeve 2 and shell parts 3 and 5 are formed of a conductive metal. The shell parts 3 and 5 are each closed at one end and lined with scintillant plastic 4 and 6, respectively. Plastic scintillant may be separately molded or machined parts or may be a varnish coating on an inside surface of the shell parts 3 and 5. The shell parts 3 and 5 as supported by the sleeve 2 form an enclosed ionization chamber in the configuration shown in FIG. 1.

Figure 2:
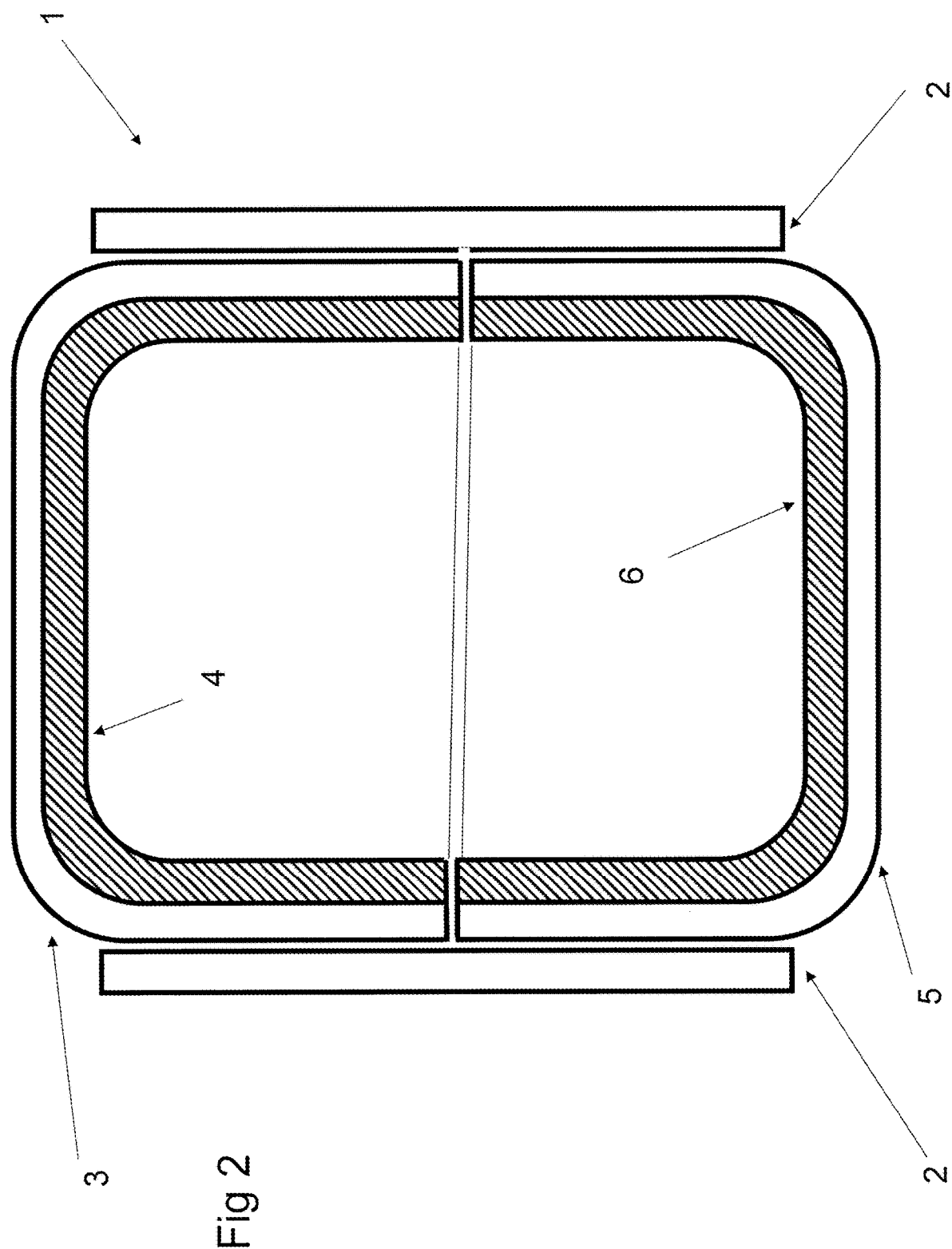
FIG. 2 is a slightly enlarged version of FIG. 1, also showing gaps permitting gaseous diffusion.

FIG. 2 is a slightly enlarged version of FIG. 1, to illustrate the presence of separation between the shell parts 3 and 5 and the outer sleeve 5, as well as between the upper part 3 and its liner 4, and lower shell part 5 and its shell 6. There is thus created a channel communicating with the outside air, through which gases can diffuse, but which exclude light. An optimal rate of diffusion may be created by design of the gap of this separation and the areas of the interfaces. Further, by additional components, a more tortuous path may be created to increase exclusion of light.

Figure 3:
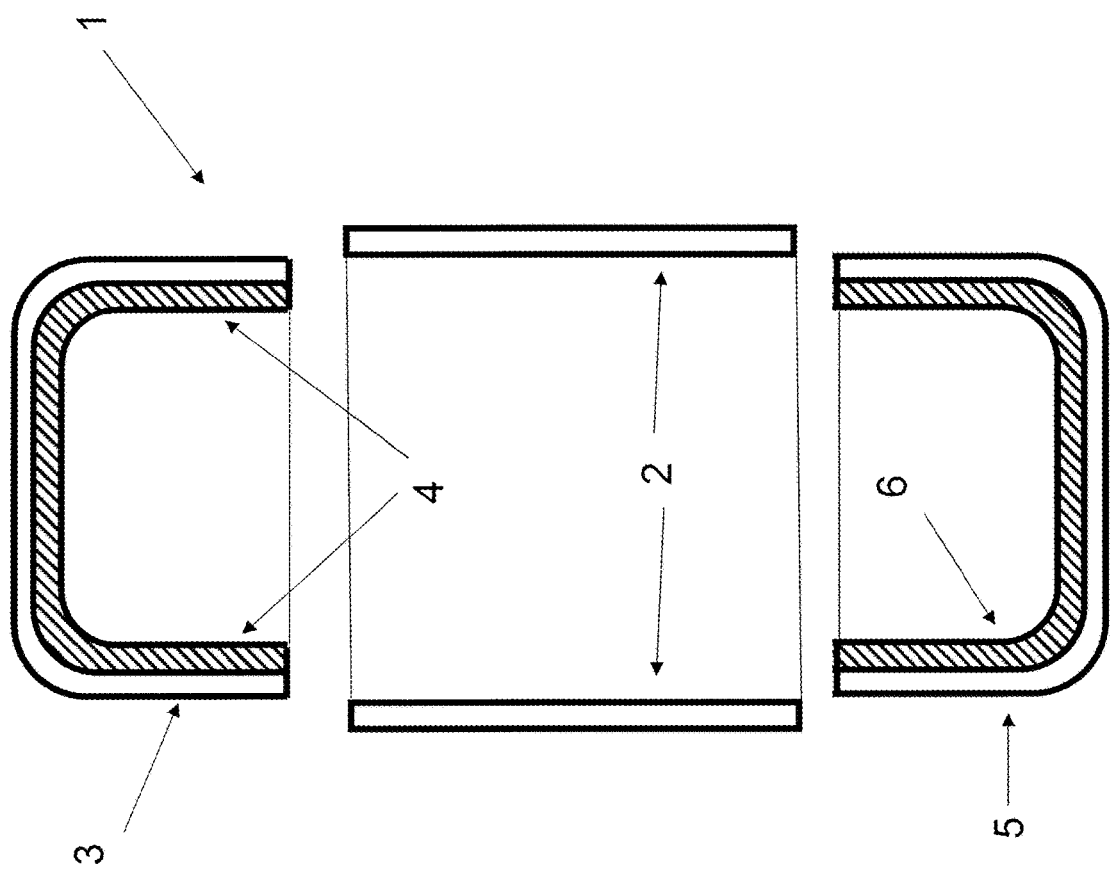
FIG. 3 is an exploded view of the device as in FIG. 1 showing three components: two shells of ionization chamber and a sleeve for maintaining the shells together and for control of diffusion.

FIG. 3 shows the same numbered parts as in FIG. 1 except they are separated in an exploded fashion. The outer cylindrical sleeve 2 is solid but may also be perforated to increase diffusive flow while still maintaining part integrity. There may also be present gaskets between the sleeve 2 and the ionization chamber parts 3 and 5 to maintain structural stability while controlling diffusion of air into the interior chamber. The gap between chamber parts may also be increased to increase diffusion, rather than abutting as in FIG. 1.

Figure 4:
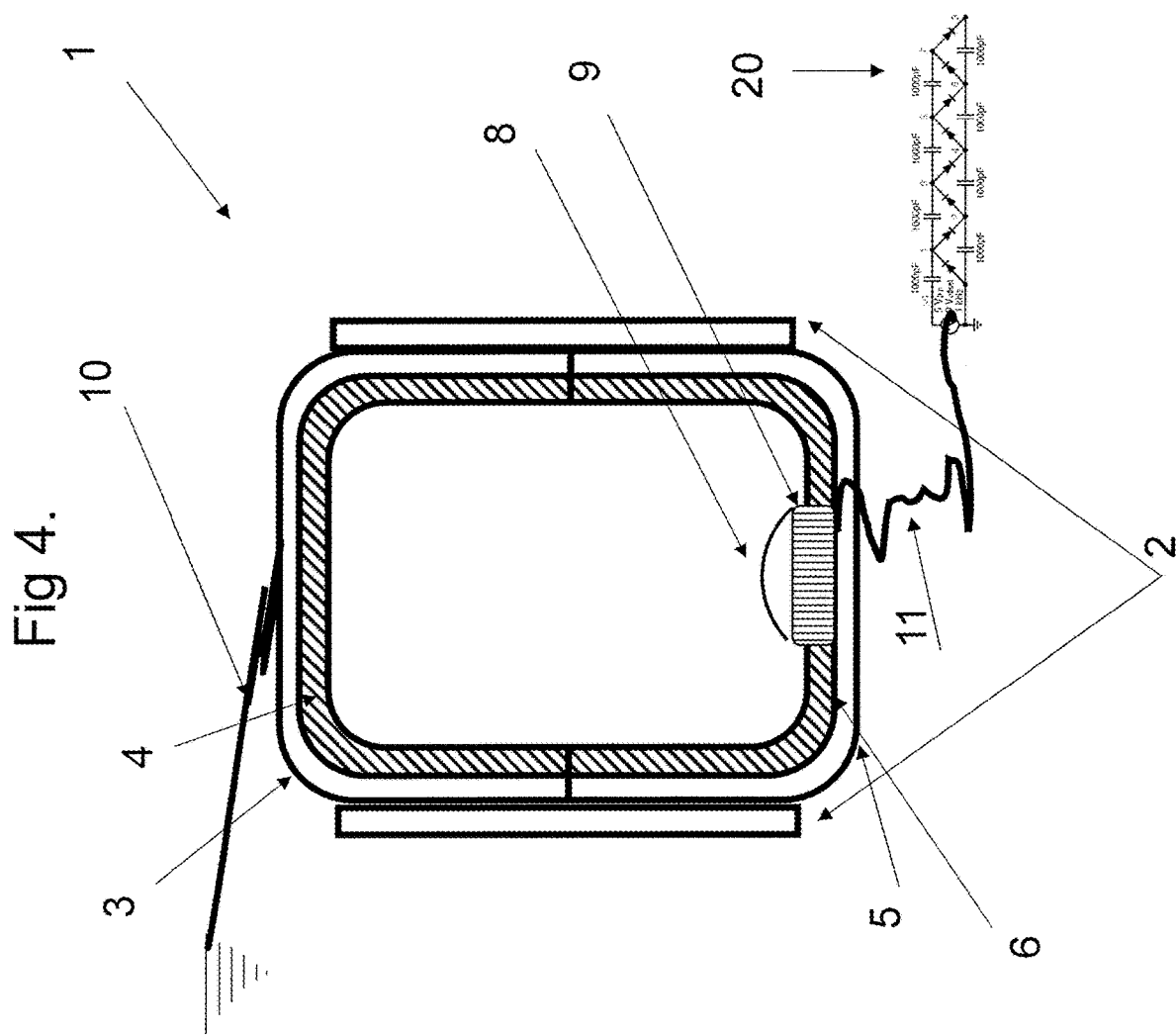
FIG. 4 is a sectional view of the assembled radon detection device additionally including an image sensor, a lens, and electrical connections.

FIG. 4 shows the radon detection device as in FIG. 1 including a sensor 9 mounted to the end wall of the bottom shell part 5. In one form, the sensor 9 may comprise an array of photo sensitive elements, referred to as photodetectors. As described, the photodetectors produce low amplitude current pulses in response to the impingement of alpha particles thereon. These can be counted by conventional circuits and devices. The sensor may be an array of an application-specific integrated circuit (ASIC). The sensor 9 may be a CCD sensor or a CMOS sensor or any other current technology of photodetectors arranged in an array. It is well-known that CCD or semiconductor arrays will pick up alpha particles, as discussed above. In one embodiment, the radon detection device may comprise the metal housing that excludes light but permits some diffusion of air, and the array of photodetectors.

In another embodiment, the sensor 9 comprises an image sensor, such as an integrated camera chip. In an exemplary embodiment, the image sensor 9 may be, for example, a type MT9M114 digital image sensor from ON Semiconductor, A lens 8 is mounted atop the image sensor 9. The lens 8 is designed to have fixed focus of the entire interior surface of the scintillant 4 and 6. Image sensors are designed so that the lens 8 may be affixed directly on surface of the included image sensor 9. The lens 8 may be refractive as indicated, or may be a diffractive grating with similar focusing properties.

Also shown are an upper electrical connector 10 electrically affixed to the upper shell part 3, and a lower electrical connector 11 electrically affixed to the lower shell part 5. The upper electrical connector 10 is used to provide a negative or ground bias to the upper shell part 3 of the chamber. The lower electrical connector 11 connects to the image sensor 9 to provide positive bias at the sensor and for transmitting image data captured by the image sensor 9. Positive bias may be provided by a voltage multiplier of a voltage pump, as needed, and a component illustrated at 20 is a representative of voltage multiplier or other power source, as is apparent. This provides an electrical field that directs the alpha particles to the scintillant 4 and 6.

Figure 5:
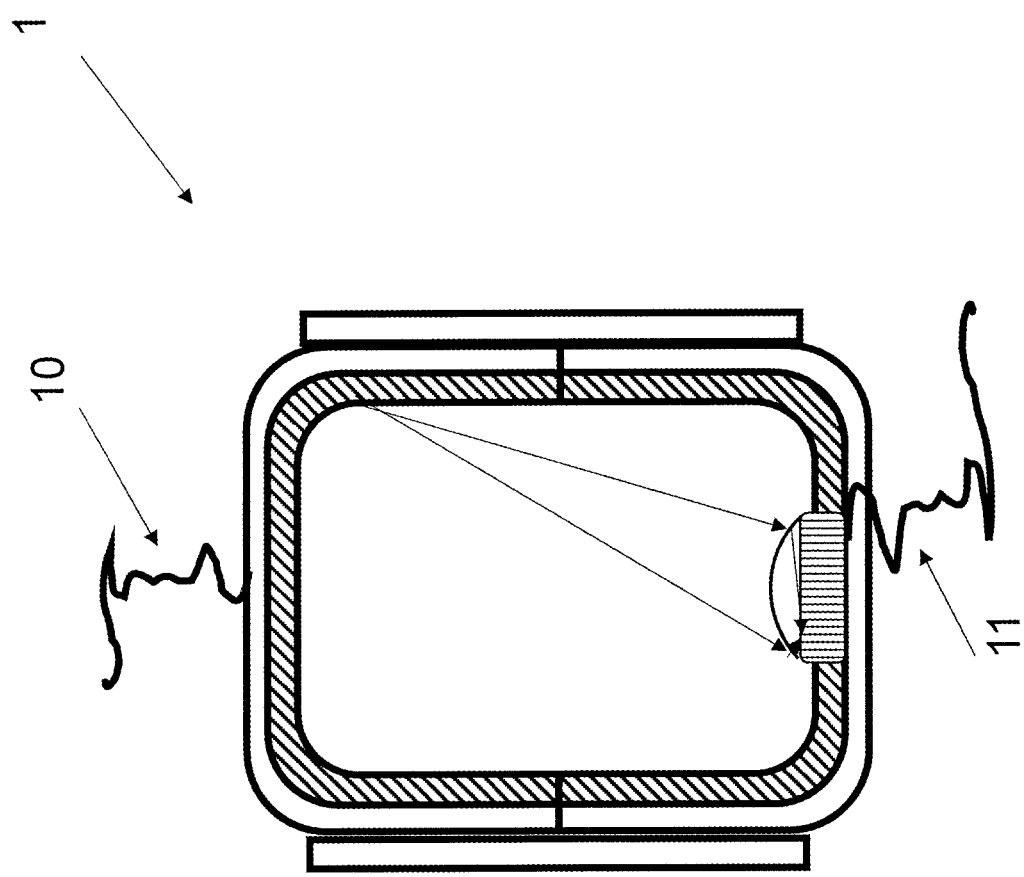
FIG. 5 is a view similar to FIG. 4 showing the image sensor, lens and imaging ray tracing from a point scintillation.

FIG. 5 is a view similar to FIG. 4, with labelling of the parts omitted for clarity and arrows are a ray diagram showing how a localized point of scintillation will be focused at a corresponding point on the focal plane of the lens 8 for capture by the image sensor 9.

FIGS. 6A and 6B show an alternative arrangement of components to form a radon detection device 17 in cylindrical form. This has the advantage of easier manufacture and assembly than the device 1 of FIG. 1. It is easier to construct plastic scintillant in the form of cylinders. FIG. 6A shows the assembled device 17 and FIG. 6B shows a removable upper lid 12 and a lower end wall 15 removed to provide view of internal components such as the lens 8 and the image sensor 9. Internal nested cylinders are not visible in this view. In this case, an ionization chamber is completed by the lid 12 and the bottom end wall 15. The lens 8 and the image sensor 9 are mounted on the bottom end wall 15. Although not shown, this embodiment will be provided with a positive electrical bias at the sensor 9 and a ground or negative bias of the metal cylinders, as above.

Figure 7:
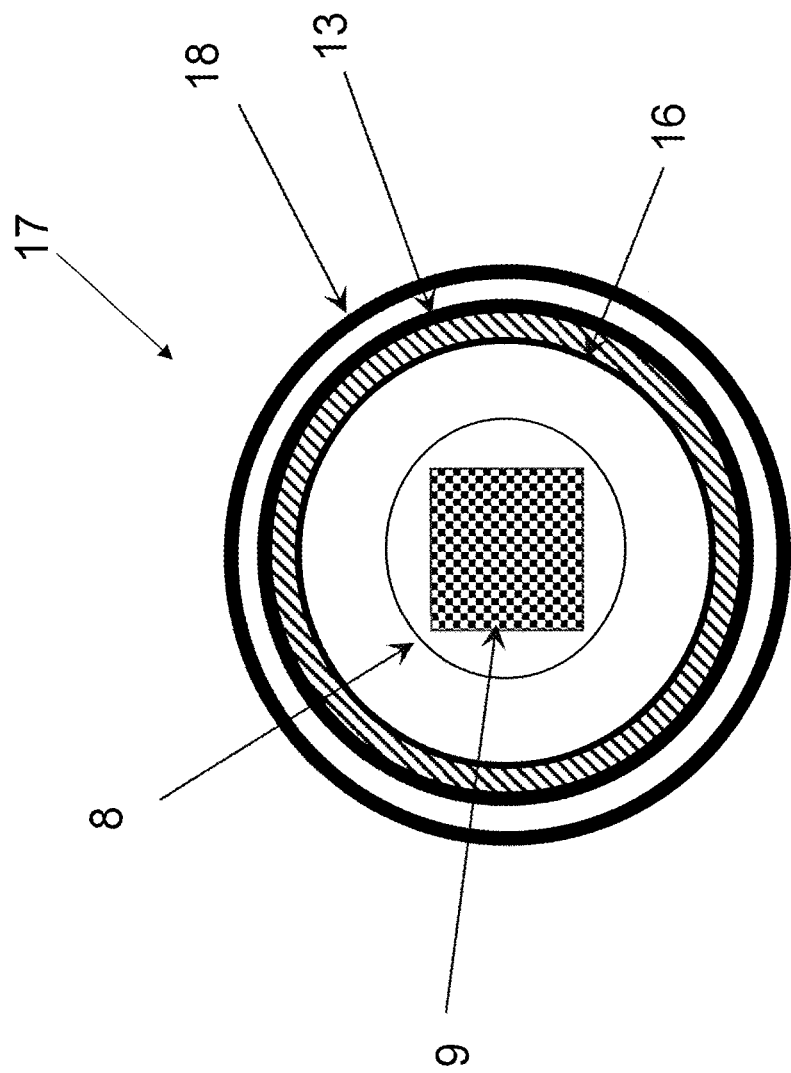
FIG. 7 is a top view of the device of FIG. 6A with a lid removed.

FIG. 7 is a top view of the radon detection device 17 with the lid 12 removed. Visible here are the top edges of an outer cylinder 18 and an inner upper cylinder 13. A plastic scintillant 16 is inside an inner surface of the inner upper cylinder 13. The lens 8 and the image sensor array 9 or seen at the bottom. Also visible is significant spacing represented by the dark line between the outer cylinder 18 and the inner cylinder 13.

FIG. 8 shows an exploded view of the components of the device 17 of FIG. 6. The plastic scintillant 16 is in the form of a cylinder closed at a bottom end. There is an inner lower cylinder 14 below the inner upper cylinder 13, which was not visible in FIG. 7. The inner cylinders 13 and 14 are of similar diameter. Overall elements are the larger conductive metal outer cylinder 18, smaller conductive metal inner cylinders 13 and 14, to be telescopically received in the outer cylinder 18, the non-metallic lid 12 and the non-metallic bottom piece 15 with the imaging lens 8 and the image sensor 9.

The lid 12 provides an airtight seal and excludes ambient light. In FIG. 8 the scintillant 16 is a hollow cylinder which is easily fabricated and assembled into the inner cylinders 13 and 14. The lid 12 may have its interior surface coated with scintillator, but is not represented in this configuration. The spaces and gaps between the cylinders 13, 14 and 18 are not tightly sealed but create a circuitous pathway which permits diffusion of air but provides a light-lock. The lid 12 is not conductive so the electric field will drive charged particles toward the walls of the inner cylinders 13 and 14 which may be at high potential or grounded. As in the device of FIG. 1, gaps, and area of overlap of parts 13, 14 and 18 may be adjusted to control diffusive flow of noble gas radon compared with other charged or radioactive particles that may be in the air, such that timing to an equilibrium reading is short enough to be acceptable, such as minutes or hours, compared with days for prior art devices.

Figure 9:
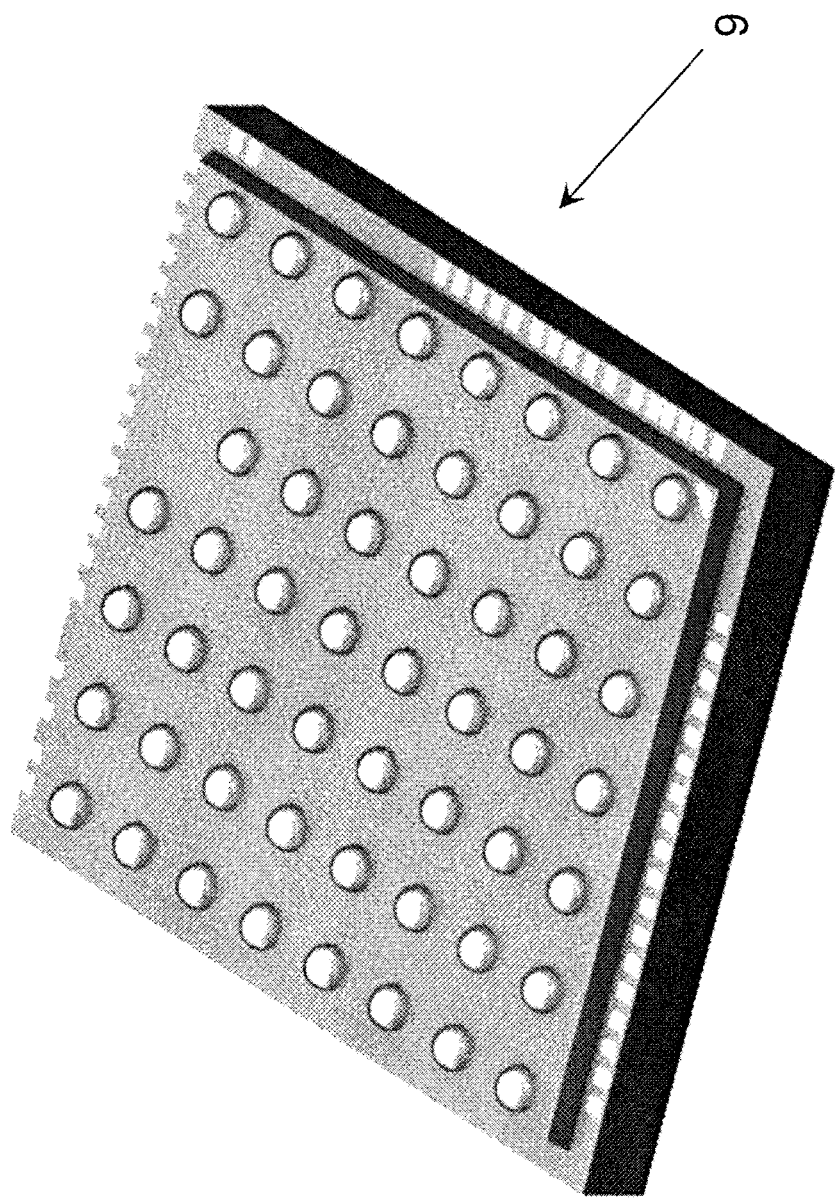
FIG. 9 is a perspective view of a commercially available digital image sensor as may be used in the radon detection devices described herein.

FIG. 9 is perspective view of the image sensor 9 as being a typical current generation camera chip, such as the MT9M114 System-On-a-Chip Digital Image Sensor, as used in mobile phones having lens directly attached to surface of image photosensor array.

Figure 10:
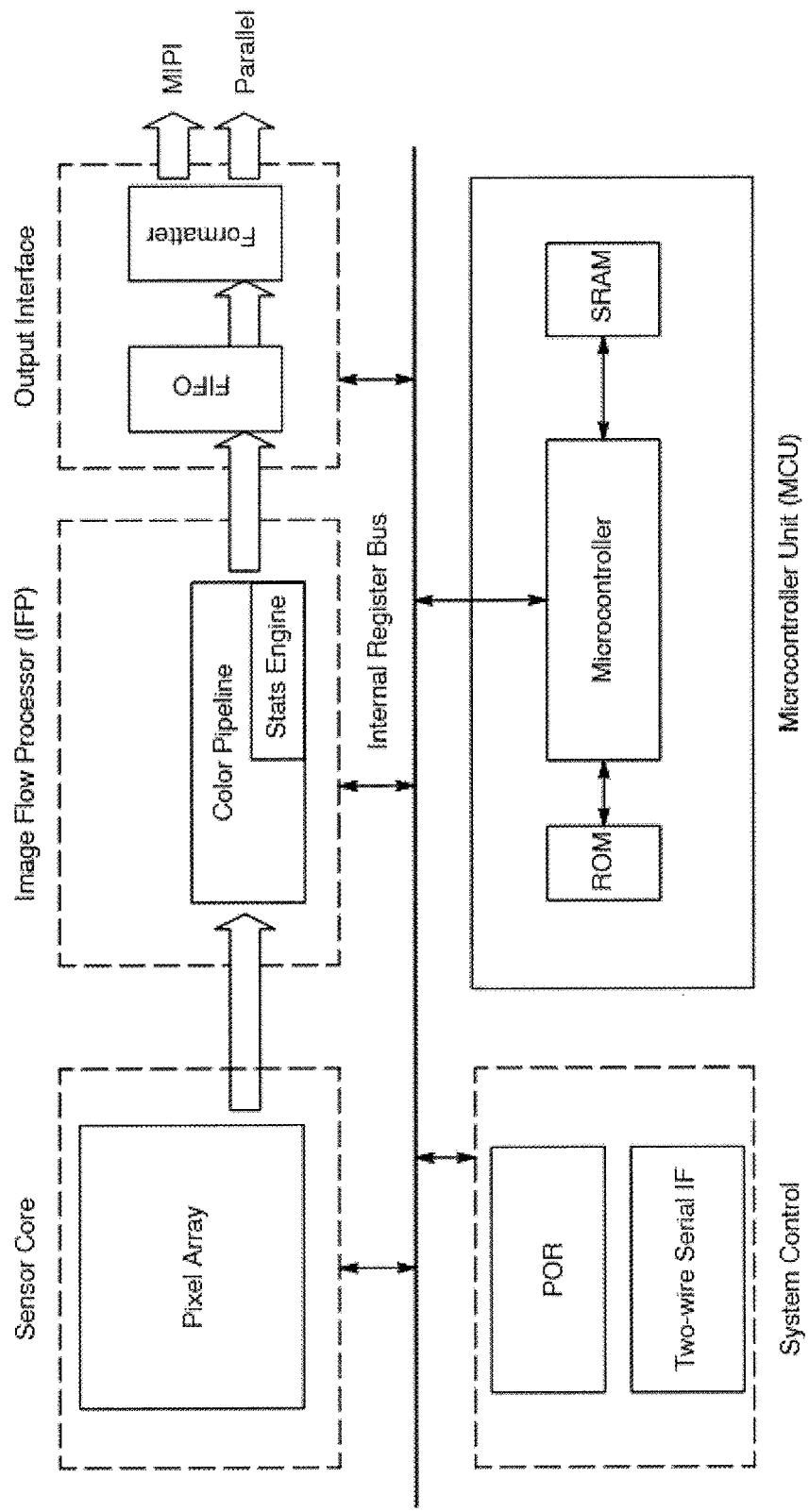
FIG. 10 is a block diagram of the firmware of the digital image sensor as in FIG. 9.

FIG. 10 is a block diagram of the MT9M114. The MT9M114 provides both image acquisition and processing. An integrated microcontroller controls operation. The processed image data is transmitted to an external host system either through a parallel or an MIPI interface via the connector 11, see FIG. 4. The host system can use standard image analysis as done in photography. The particular processing used does not form part of the invention.

The software reading the imaging sensor will detect only flashes of points of scintillation and will be insensitive to events causing an extended luminous event, or vibration of the device. The resultant signal will also be gated according to intensities of flashes corresponding the defined decay events of radon and its daughters.

Since the ability to detect single point flashes will be limited by ambient light, the system of overlapping concentric metal parts of the device 1 of FIG. 1, and device 17 of FIG. 5, can be designed to, in addition controlling diffusion of molecules into the ionization chamber, act as light locks, minimizing or excluding access of light to the interior.

Figure 11:
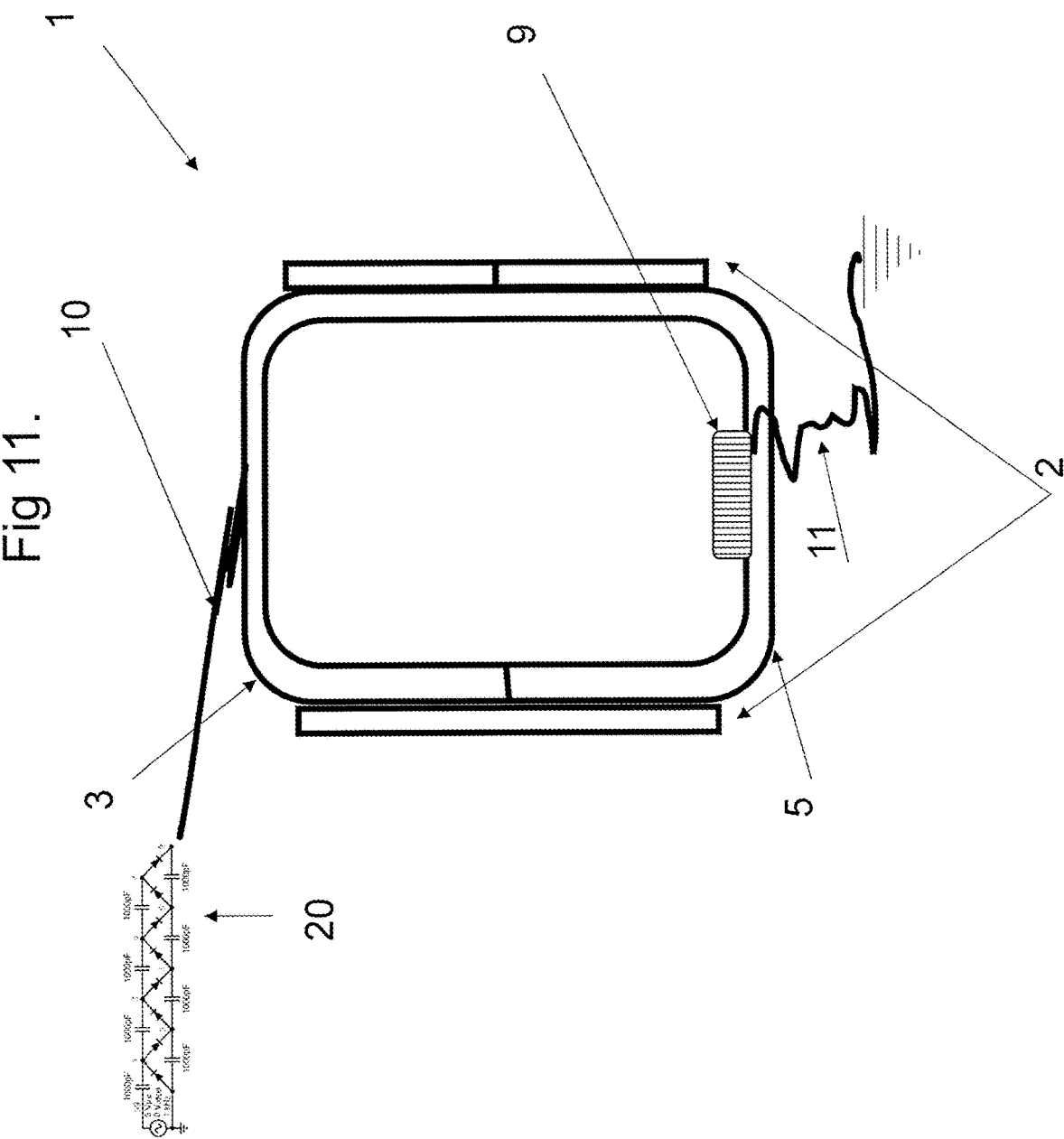
FIG. 11 is a sectional view of the assembled radon detection device similar to FIG. 4 for an alternative embodiment.

FIG. 11 is an alternative configuration where the polarity is reversed, scintillator is absent and positively charged nucleons will be propelled to the sensor 9. In this embodiment, the sensor 9 may comprise an array of photo sensitive elements, or photodetectors. Such photodetectors produce low amplitude current pulses in response to the impingement of alpha particles thereon. The firmware controlling the sensors may provide gating to selectively detect signals emitted at the known energy levels of the radon disintegration nuclide pathways and to screen out events that are not in the pathway by virtue of their energy of localization in the array. For example, cosmic rays may generate signals that are not localized as the alpha disintegrations of the radon nuclides.

Further, electrical contact will be maintained between the overlapping metal components to permit the creation of a uniform positive bias relative to the grounded image sensor.

Thus, as described hereinabove, a detection device for quantitation of radon comprises an ionization chamber using partially overlapping metal shell components, scintillant disposed within the chamber to capture charged particles propelled by a negative electrical bias of said shell, and an image sensor to detect point location and light intensity of individual scintillation events in said scintillant, thereby discriminating individual radon disintegration events. The device is compact, inexpensive, does not require a professional to operate, and which, further, can yield a significant measurement in hours or minutes rather than days. Overall size of the device can be anywhere in a range of about 1 cm to 10 cm.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible.

The foregoing disclosure of specific embodiments is intended to be illustrative of the broad concepts comprehended by the invention.

The invention claimed is:

1. A radon detection device for quantitation of radon comprising;
   a housing defining an enclosed chamber, the housing comprising partially overlapping metal components to exclude ambient light and allow diffusion of gas into the chamber, a sensor in said housing comprising an array of photodetectors for registering alpha particle disintegration, and a voltage source providing a positive electrical bias to said housing relative to said sensor.

2. The radon detection device of claim 1 wherein the array is a charged couple device (CCD).

3. The radon detection device of claim 1 wherein the array is a complementary metal-oxide-semiconductor device (CMOS).

4. The radon detection device of claim 1 wherein the image sensor is an application-specific integrated circuit (ASIC).

5. The radon detection device of claim 1 wherein the housing components are internally coated with scintillant.

6. The radon detection device of claim 5 wherein the sensor comprises an image sensor.

7. The radon detection device of claim 6 wherein a lens associated with the image sensor focuses an image of alpha particle generating photons in said scintillant on to an array of the image sensor.

8. The radon detection device of claim 1 wherein said housing comprises upper and lower cylindrical shell parts surrounded by an outer sleeve with overlapping zones to trap exogenous light.

9. The radon detection device of claim 5 wherein the voltage source creates ion-propelled flow within the chamber to direct charged particles to said scintillant.

10. The radon detection device of claim 1 wherein the voltage source comprises a voltage multiplier.

11. A radon detection device for quantitation of radon comprising;
    a housing defining an enclosed ionization chamber, the housing comprising partially overlapping metal components to allow diffusion of gas into the ionization chamber, a scintillant disposed within the ionization chamber to capture charged particles, an image sensor in said housing to detect point location and light intensity of individual scintillation events in said scintillant, and a voltage source providing a positive electrical bias to said sensor.

12. The radon detection device of claim 11 wherein the housing is radially symmetric around a vertical axis.

13. The radon detection device of claim 12 wherein the housing comprises an outer cylindrical sleeve receiving upper and lower metal ionization chamber shell parts each closed at one end defining an enclosed ionization chamber.

14. The radon detection device of claim 13 wherein the shell parts are of one-piece construction.

15. The radon detection device of claim 13 wherein the lower shell part is cylindrical with a planar bottom wall and the upper shell part is closed by a removable lid.

16. The radon detection device of claim 13 wherein the housing shell parts are internally coated with scintillant.

17. The radon detection device of claim 11 wherein a lens associated with the image sensor focuses an image of alpha particle generating photons in said scintillant on to an array of the image sensor.

18. The radon detection device of claim 11 wherein said housing shell parts comprise upper and lower cylinders closed at end walls and surrounded by an outer sleeve with overlapping zones to trap exogenous light.

19. The radon detection device of claim 11 wherein the voltage source is a voltage multiplier of a voltage pump.

20. The radon detection device of claim 11 further comprising a conductor for transferring image data from the sensor to an external device.

* * * * *